United States Patent
Ponjican et al.

(10) Patent No.: US 7,048,783 B2
(45) Date of Patent: May 23, 2006

(54) VACUUM CLEANER AIR/LIQUID SEPARATOR

(75) Inventors: Samuel Ponjican, Gulfport, MS (US); Charles W. Reynolds, Long Beach, MS (US); Christopher M. Paterson, Biloxi, MS (US); Dennis T. Lamb, Long Beach, MS (US); Bruce M. Kiern, Gulfport, MS (US)

(73) Assignee: Oreck Holdings, LLC, Cheyenne, WY (US)

( * ) Notice: Subject to any disclaimer, the term of this patent is extended or adjusted under 35 U.S.C. 154(b) by 105 days.

(21) Appl. No.: 10/822,925

(22) Filed: Apr. 13, 2004

(65) Prior Publication Data

US 2005/0223897 A1  Oct. 13, 2005

(51) Int. Cl.
*B01D 45/12* (2006.01)

(52) U.S. Cl. ............... 95/269; 55/447; 55/459.1; 55/DIG. 3; 15/353

(58) Field of Classification Search ............ 55/337, 55/399, 459.1, 459.2, 447, DIG. 3; 95/269, 95/271; 15/320, 353
See application file for complete search history.

(56) References Cited

U.S. PATENT DOCUMENTS

| | | | | |
|---|---|---|---|---|
| 418,836 | A * | 1/1890 | Allington | 55/394 |
| 3,042,202 | A * | 7/1962 | Work | 209/135 |
| 3,513,642 | A * | 5/1970 | Cornett | 55/399 |
| 3,778,984 | A * | 12/1973 | Lawser | 55/333 |
| 3,850,816 | A * | 11/1974 | Koch | 210/512.1 |
| 4,146,359 | A * | 3/1979 | Lumpkin et al. | 432/14 |
| 4,257,786 | A * | 3/1981 | Sogo et al. | 96/372 |
| 4,270,975 | A * | 6/1981 | Bennett | 159/27.2 |
| 4,600,410 | A * | 7/1986 | Baillie et al. | 95/269 |
| 4,801,310 | A * | 1/1989 | Bielefeldt | 210/788 |
| 4,842,145 | A * | 6/1989 | Boadway | 209/719 |
| 4,957,520 | A * | 9/1990 | Parmentier et al. | 96/136 |
| 5,669,948 | A * | 9/1997 | Brottg.ang.rdh et al. | 55/459.1 |
| 5,779,744 | A | 7/1998 | Mueller et al. | |
| 5,901,406 | A | 5/1999 | Mueller et al. | |
| 6,055,701 | A | 5/2000 | Grey et al. | |
| 6,056,856 | A | 5/2000 | Graf | |
| 6,553,614 | B1 | 4/2003 | Leon | |
| 2001/0022010 | A1 | 9/2001 | Kasper | |
| 2001/0050001 | A1 | 12/2001 | Wilkins | |
| 2002/0166193 | A1 | 11/2002 | Kasper | |
| 2003/0051306 | A1 | 3/2003 | Morgan et al. | |
| 2003/0213091 | A1* | 11/2003 | Oh et al. | 15/353 |
| 2003/0226228 | A1 | 12/2003 | Symensma et al. | |

FOREIGN PATENT DOCUMENTS

| | | |
|---|---|---|
| DE | 195 00 876 A1 | 7/1995 |
| WO | WO 98/43721 A | 10/1998 |
| WO | 198 37 087 C1 | 12/1999 |

* cited by examiner

*Primary Examiner*—Frank M. Lawrence
(74) *Attorney, Agent, or Firm*—Setter Ollila LLC

(57) ABSTRACT

A vacuum cleaner air/liquid separator is provided according to the invention. The separator includes an offset air/liquid airflow inlet for receiving an air/liquid airflow, with the offset air/liquid airflow inlet possessing a width and a height. The separator further includes a substantially cylindrical separator chamber communicating with the offset air/liquid airflow inlet, wherein the offset air/liquid airflow inlet is radially offset from the separator chamber. The separator further includes a lead-in track extending from the offset air/liquid airflow inlet and at least partially around the circumference of the separator chamber. The lead-in track tapers from substantially the width of the offset air/liquid airflow inlet into the separator chamber. The air/liquid airflow is entrained into a downward spiraling path in the separator chamber by the lead-in track.

20 Claims, 4 Drawing Sheets

SECTION AA

VACUUM CLEANER AIR/LIQUID SEPARATOR

TECHNICAL FIELD

The present invention relates to an air/liquid separator, and more particularly, to a vacuum cleaner air/liquid separator.

BACKGROUND OF THE INVENTION

Vacuum cleaners are widely used for picking up dirt and debris. A vacuum cleaner therefore includes a motor and impeller that together generate a vacuum airflow. A powered brushroll is rotated by a motor and functions to dislodge dirt and debris on an underlying surface. The powered brushroll additionally propels the dirt and debris into the vacuum airflow.

A carpet cleaner machine is a specialized vacuum cleaner. Cleaning a carpet presents extra challenges to a vacuum cleaner. Foreign matter can get down into the carpet fibers, and therefore can be very difficult to dislodge and remove. Furthermore, the foreign matter can comprise dirt and debris that is tangled or embedded in the carpet fibers, that is sticky or capable of hardening or congealing, etc. Consequently, the foreign matter cannot be simply lifted out of the carpet by a vacuum airflow. Such foreign matter usually necessitates the use of a carpet cleaner machine. A typical carpet cleaner machine uses a cleaning liquid to soften and remove foreign matter from carpet fibers. The cleaning liquid can comprise water and/or soaps, detergents, etc. In addition, the cleaning liquid can be heated in order to improve the cleaning action, such as a carpet cleaner machine using steam or steam including a soap or detergent.

A carpet cleaner machine operates by spraying the cleaning liquid down into the carpet and then pulling the cleaning liquid back out of the carpet. The foreign matter is loosened or at least partially dissolved by the cleaning liquid, and therefore is picked up with the cleaning liquid by the vacuum airflow of the carpet cleaner machine. The carpet cleaner machine can additionally employ a powered brushroll or beater bar that works the cleaning liquid down into the carpet and aid in breaking up and removing the foreign matter.

The cleaning liquid contains dirt and debris picked up from the carpet. The cleaning liquid is typically processed by the carpet cleaner machine after it has been picked up in order to separate the cleaning liquid out of the vacuum airflow. The separated liquid can be re-used or can be disposed of by the operator of the carpet cleaner machine. The separated cleaning liquid therefore can be reclaimed and returned to a cleaning liquid tank, or can be kept in a separate "dirty fluid" tank.

In the prior art, the cleaning liquid is typically removed from the vacuum airflow by gravity. The air/liquid airflow is passed into a separation chamber, where the liquid falls out of the airflow and falls to the bottom of a reclamation tank. However, there is a drawback to this prior art approach. The reliance on gravity to pull the cleaning liquid out of the airflow will generally remove the largest drops of liquid. However, suspended liquid in the form of small droplets and/or water vapor is not efficiently removed from the airflow. In addition, the efficacy of this prior art approach depends to some degree on the length of the airflow path, and a prior art carpet cleaner machine therefore can include a serpentine airflow path in order to increase the length of the airflow path. This necessitates a relatively large reclamation area/reclamation tank, increasing the size, weight, and bulk of the prior art carpet cleaner machine. Even with a large reclamation tank, practical considerations of carpet cleaner machine size will limit the size of the reclamation tank.

Another prior art approach is to run the air/liquid airflow through some manner of filter in order to remove the cleaning liquid. The fluid is generally trapped in the filter, and then drops into the reclamation tank. However, this prior art approach also has drawbacks. The filter can clog with liquid and dirt over time, impeding both removal of the cleaning liquid and dirt and impeding the overall cleaning effectiveness of the carpet cleaner machine by reducing the vacuum airflow.

SUMMARY OF THE INVENTION

A vacuum cleaner air/liquid separator is provided according to an embodiment of the invention. The vacuum cleaner air/liquid separator comprises an offset air/liquid airflow inlet for receiving an air/liquid airflow. The offset air/liquid airflow inlet possesses a width and a height. The air/liquid separator further comprises a substantially cylindrical separator chamber communicating with the offset air/liquid airflow inlet. The offset air/liquid airflow inlet is radially offset from the separator chamber. The air/liquid separator further comprises a lead-in track extending from the offset air/liquid airflow inlet and at least partially around the circumference of the separator chamber. The lead-in track tapers from substantially the width of the offset air/liquid airflow inlet into the separator chamber. The air/liquid airflow is entrained into a downward spiraling path in the separator chamber by the lead-in track.

A method of providing a vacuum cleaner air/liquid separator is provided according to an embodiment of the invention. The method comprises providing an offset air/liquid airflow inlet for receiving an air/liquid airflow, with the offset air/liquid airflow inlet possessing a width and a height. The method further comprises providing a substantially cylindrical separator chamber communicating with the offset air/liquid airflow inlet. The offset air/liquid airflow inlet is radially offset from the separator chamber. The method further comprises providing a lead-in track extending from the offset air/liquid airflow inlet and at least partially around the circumference of the separator chamber. The lead-in track tapers from substantially the width of the offset air/liquid airflow inlet into the separator chamber. The air/liquid airflow is entrained into a downward spiraling path in the separator chamber by the lead-in track.

BRIEF DESCRIPTION OF THE DRAWINGS

The same reference number represents the same element on all drawings. It should be noted that the drawings are not necessarily to scale.

DETAILED DESCRIPTION OF THE INVENTION

Figure 1:
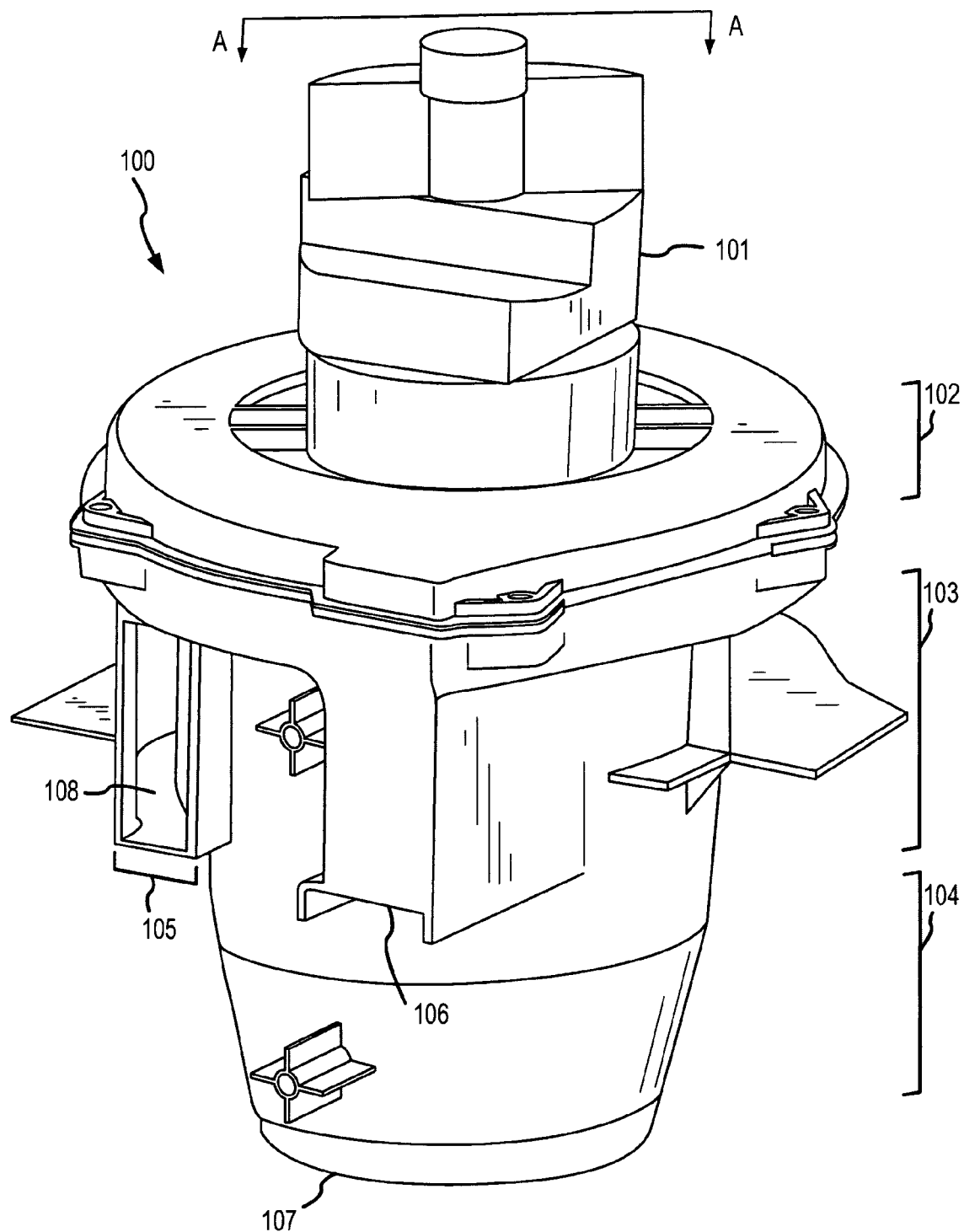
FIG. 1 shows a vacuum cleaner air/liquid separator according to an embodiment of the invention.
Figure 2:
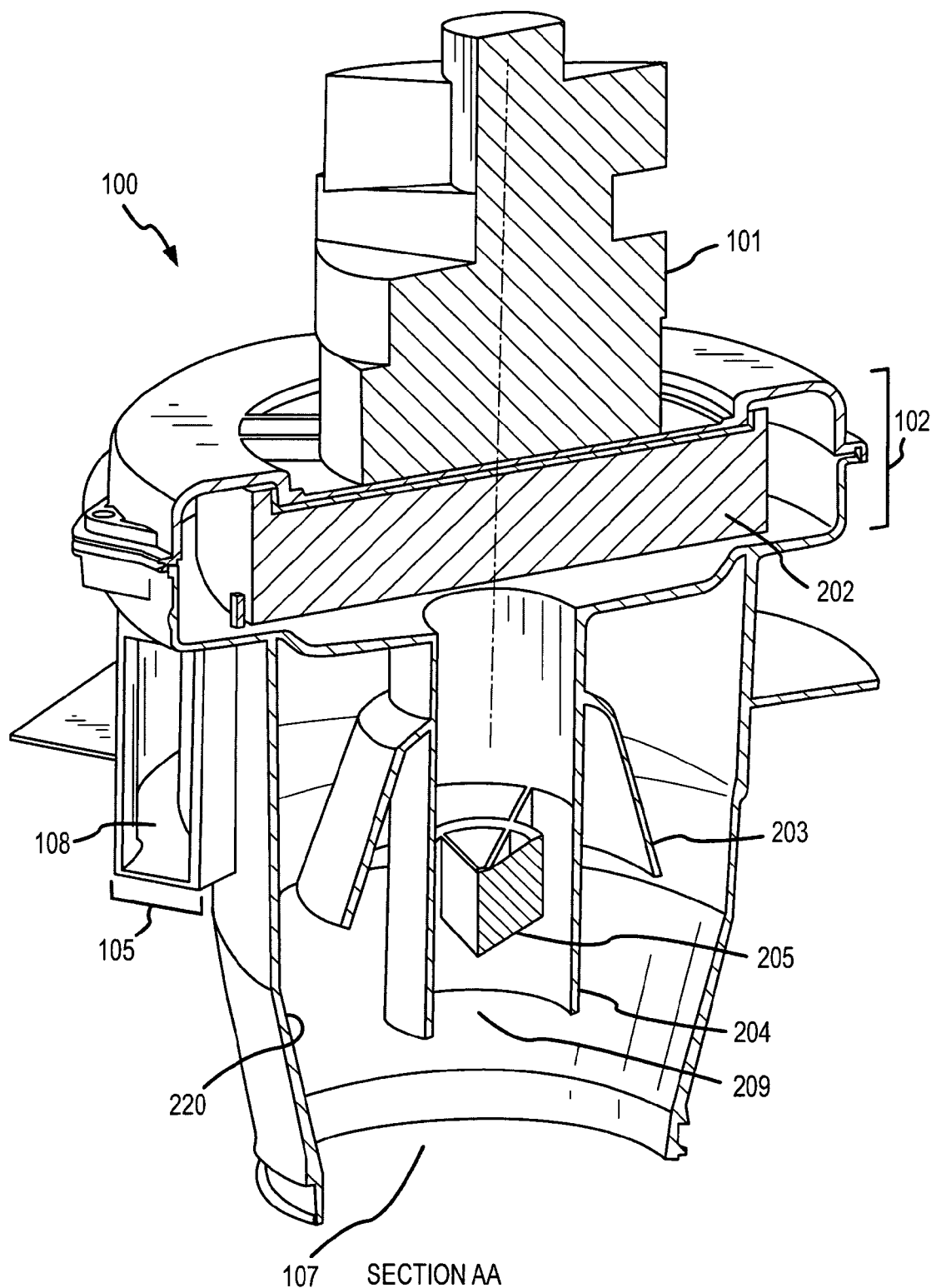
FIG. 2 is a sectional view of the air/liquid separator along section line AA of FIG. 1.
Figure 3:
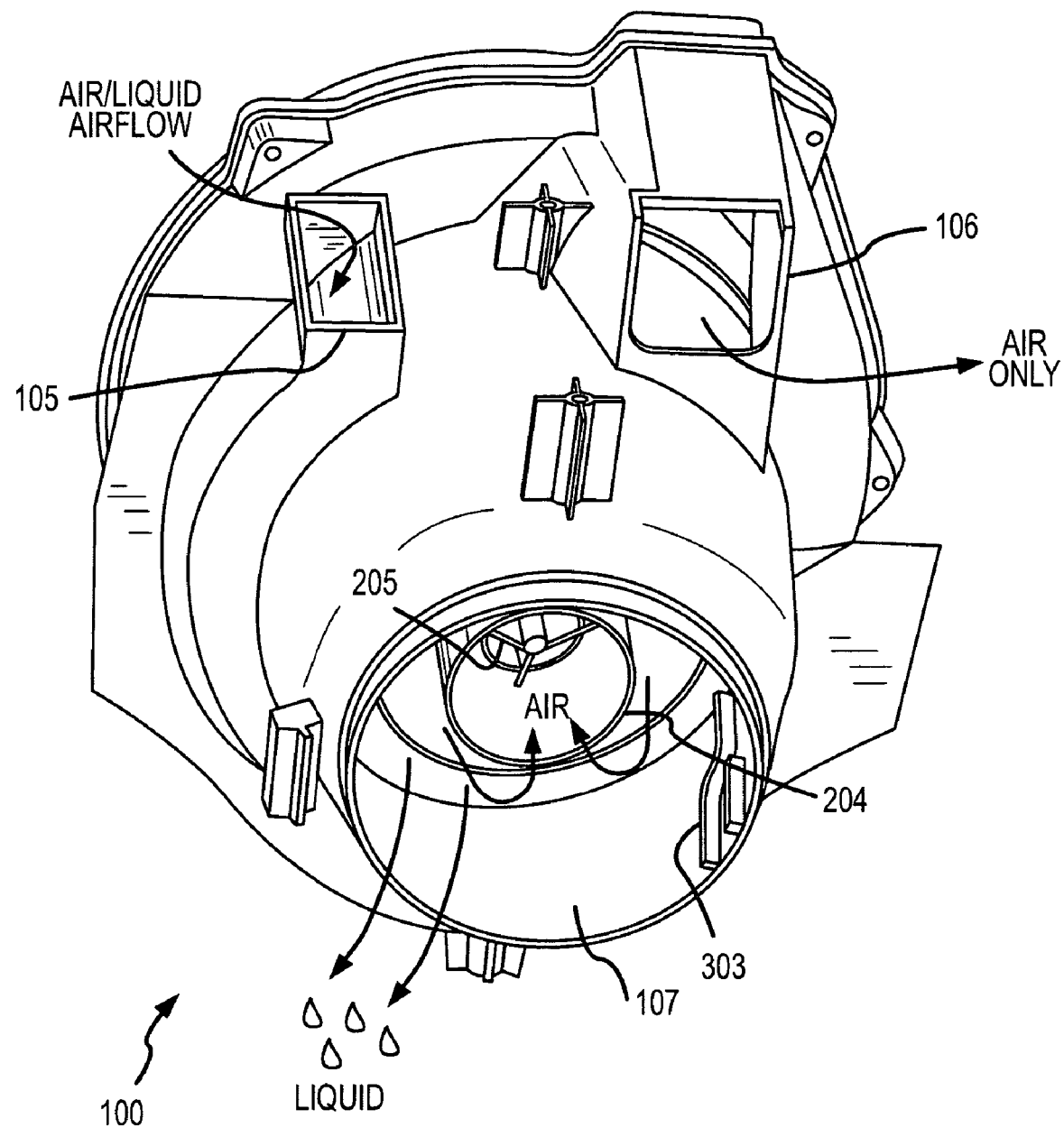
FIG. 3 is a bottom view of the air/liquid separator looking up into a liquid outlet.

FIGS. 1–3 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 shows a vacuum cleaner air/liquid separator 100 according to an embodiment of the invention. The air/liquid separator 100 includes a motor 101, an impeller 202 (see FIG. 2), a separator impeller chamber 102, a separator chamber 103, a separator lower chamber 104, an offset air/liquid airflow inlet 105, an air outlet 106, and a liquid outlet 107. A lead-in track 108 extends from the offset air/liquid airflow inlet 105 into the separator chamber 103.

The air/liquid separator 100 generates a vacuum airflow for a vacuum cleaner. In addition, the air/liquid separator 100 removes liquids from the vacuum airflow. Therefore, in operation, an air/liquid airflow enters the offset air/liquid airflow inlet 105, air exits from the air outlet 106, and liquids removed from the air/liquid airflow by the air/liquid separator 100 drop out of the liquid outlet 107 (see FIG. 3).

The air/liquid separator 100 can comprise a component of any type of vacuum cleaner. The air/liquid separator 100 has special applicability in a carpet cleaner machine, wherein the air/liquid mixture picked up by the carpet cleaner machine is passed through the air/liquid separator 100 in order to separate out the liquid. In addition, the air/liquid separator 100 can be used in a shop vacuum cleaner, in a wet/dry vacuum cleaner, or in any cleaning machine that employs a vacuum airflow to pick up liquids.

The motor 101 and impeller 202 generate the vacuum airflow. The motor 101 and impeller 202 can comprise any type of suitable motor and impeller. In one embodiment, the motor 101 comprises a peripheral bypass discharge motor. In another embodiment, the motor 101 comprises a skeleton style motor. The impeller 202 can comprise a conventional or tapered impeller, for example.

The offset air/liquid airflow inlet 105 receives the air/liquid airflow. The offset air/liquid airflow inlet 105 can be connected to any manner of duct, tubing, etc., and can therefore be in communication with a vacuum nozzle of a vacuum cleaner/carpet cleaner machine. The nozzle can be located so as to pick up dirt and debris, and also to pick up water or other cleaning liquid bearing suspended dirt and debris. The fluid can be heated, such as including steam, or can be unheated.

The offset air/liquid airflow inlet 105 is offset from the separator chamber 103. The offset air/liquid airflow inlet 105 therefore resides at a greater radial distance from a central axis of the separator chamber 103 than a chamber outer wall 220. Advantageously, the efficacy of the air/liquid separator 100 is improved by the offset air/liquid airflow inlet 105 being offset from the chamber outer wall 220. The radial distance of the offset air/liquid airflow inlet 105 can be varied as desired in order to affect the velocity of the swirling airflow. The increased radial distance forces the entering air/liquid airflow to increase in velocity more than if the offset air/liquid airflow inlet 105 were flush with the chamber outer wall 220. The entering air/liquid airflow is entrained into a spiral pattern as the air/liquid airflow travels in through the lead-in track 108 and travels down through the separator chamber 103 and down through the separator lower chamber 104. Airflow is drawn down through the interior of the air/liquid separator 100 in a spiral manner by the motor 101 and impeller 202. Due to conservation of angular momentum, the spiral path of the air/liquid airflow will result in the air/liquid airflow speeding up as it swirls around in the separator chamber 103 and separator lower chamber 104 and as the diameter of the swirling airflow is reduced. The increased airflow velocity results in an increase in air/liquid separation by dissimilar centrifugal forces between the air and the liquid. The liquid in the airflow, being heavier than the air, will be flung as far radially outward as possible due to the greater weight and momentum of the liquid, i.e., the liquid will swirl through the air/liquid separator 100 along an inner surface of the chamber outer wall 220. This is the basic separating action that the air/liquid separator 100 performs.

The lead-in track 108 begins at the offset air/liquid airflow inlet 105 and possesses a width and height that is the same as the offset air/liquid airflow inlet 105. The lead-in track 108 extends from the offset air/liquid airflow inlet 105 and at least partially around the circumference of the separator chamber 103. The lead-in track 108 in one embodiment extends only partially around the separator chamber 103. However, alternatively the lead-in track 108 can extend a full circumference of the separator chamber 103 (see FIG. 4 and the accompanying text), or beyond a full circumference. The lead-in track 108 tapers into the separator chamber 103. The lead-in track 108 blends the incoming air/liquid airflow into the swirling airflow in the air/liquid separator 100, starting at a greater radial distance than the chamber outer wall 220.

FIG. 2 is a sectional view of the air/liquid separator 100 along section line AA of FIG. 1. It can be seen from this figure that the air/liquid separator 100 further includes an impeller 202 and an impeller air inlet tube 204 that extends down through the separator chamber 103. The impeller air inlet tube 204 includes an air only inlet 209. The impeller air inlet tube 204 forces the swirling airflow to travel down through the separator chamber 104 and down through the separator lower chamber 104 before being drawn up through the air only inlet 209 and into the separator impeller chamber 102. The impeller air inlet tube 204 therefore assists in separating liquid from air by forcing the airflow to travel down to substantially the bottom of the separator lower chamber 104. In one embodiment, a lower end of the impeller air inlet tube 204 is located in the separator lower chamber 104, above the liquid outlet 107. However, the impeller air inlet tube 204 can be of any length and therefore the air only inlet 209 can be located in the separator chamber 104 or can be substantially flush with the liquid outlet 107, for example.

The impeller air inlet tube 204 can include one or more vanes 205. The one or more vanes 205 can be of any number, spacing, length, and size. The one or more vanes 205 substantially straighten the airflow as the airflow travels up the impeller air inlet tube 204. The one or more vanes 205 therefore reduce turbulence in the airflow entering the separator impeller chamber 102. This reduction in turbulence can improve airflow and can even reduce the noise created by the air/liquid separator 100 and impeller 202. In addition, the entire airflow path through the air/liquid separator 100 can be designed to be smooth and without sharp transitions in order to minimize noise. Moreover, the vanes 205 can aid in reducing a pressure drop and can prevent pressure variation zones in the impeller air inlet tube 204. In one embodiment, the vanes 205 are removable for ease of cleaning and maintenance of the air/liquid separator 100.

In the embodiment shown, the separator lower chamber 104 tapers from the separator chamber 103 to the liquid outlet 107 at the bottom of the separator lower chamber 104. The taper decreases the diameter of the air/liquid separator 100 in order to change the velocity of the airflow. The taper can comprise a substantially conically tapered separator lower chamber 104. However, it should be understood that a conical taper is not necessary, and the separator lower chamber 104 can comprise a curving taper, a stair-step taper, etc. The separator lower chamber 104 is not required to taper inwardly toward the bottom, and in one embodiment could instead expand in diameter in order to decrease airflow velocity and increase the liquid collection area offered by the liquid outlet 107.

The air/liquid separator 100 can further include a liquid deflector skirt 203 located on the impeller air inlet tube 204. The liquid deflector skirt 203 can comprise part of the impeller air inlet tube 204 or can comprise a separate component attached to the impeller air inlet tube 204. The liquid deflector skirt 203 in one embodiment comprises a flange that extends downwardly and outwardly from the impeller air inlet tube 204. In the embodiment shown, the liquid deflector skirt 203 comprises a substantially bell-shaped flange. However, other, non-bell skirt shapes can be employed. The liquid deflector skirt 203 is located substantially in the separator chamber 103 but can extend down into the separator lower chamber 104 if desired. The liquid deflector skirt 203 intercepts air/liquid airflow rising up along the outside of the impeller air inlet tube 204 and forces the liquid component outwardly toward the separator outer wall 220.

The impeller air inlet tube 204 is shown as being centered in the air/liquid separator 100. However, it should be understood that the impeller air inlet tube 204 (and the liquid deflector skirt 203) can alternatively be offset. Consequently, the impeller air inlet tube 204 can be located anywhere in the interior of the air/liquid separator 100.

FIG. 3 is a bottom view of the air/liquid separator 100 looking up into the liquid outlet 107. The arrows depict water falling out of the liquid outlet 107 and an air only airflow circulating up into the impeller air inlet tube 204. This figure also shows one or more vortex disruptor ribs 303 formed on an inner surface of the separator outer wall 220. Remember that the liquid component of the air/liquid airflow will be moving at the inner surface of the separator outer wall 220. The vortex disruptor ribs 303 therefore cause the liquid component of the swirling air/liquid airflow to be intercepted and directed downward to the liquid outlet 107.

In one embodiment, the air/liquid separator 100 includes three equidistantly spaced vortex disrupter ribs 303. However, any number of vortex disruptor ribs 303 can be employed, and can be located according to any pattern or distribution. The one or more vortex disruptor ribs 303 can be of any predefined number, length, width, height, or geometry.

Figure 4:
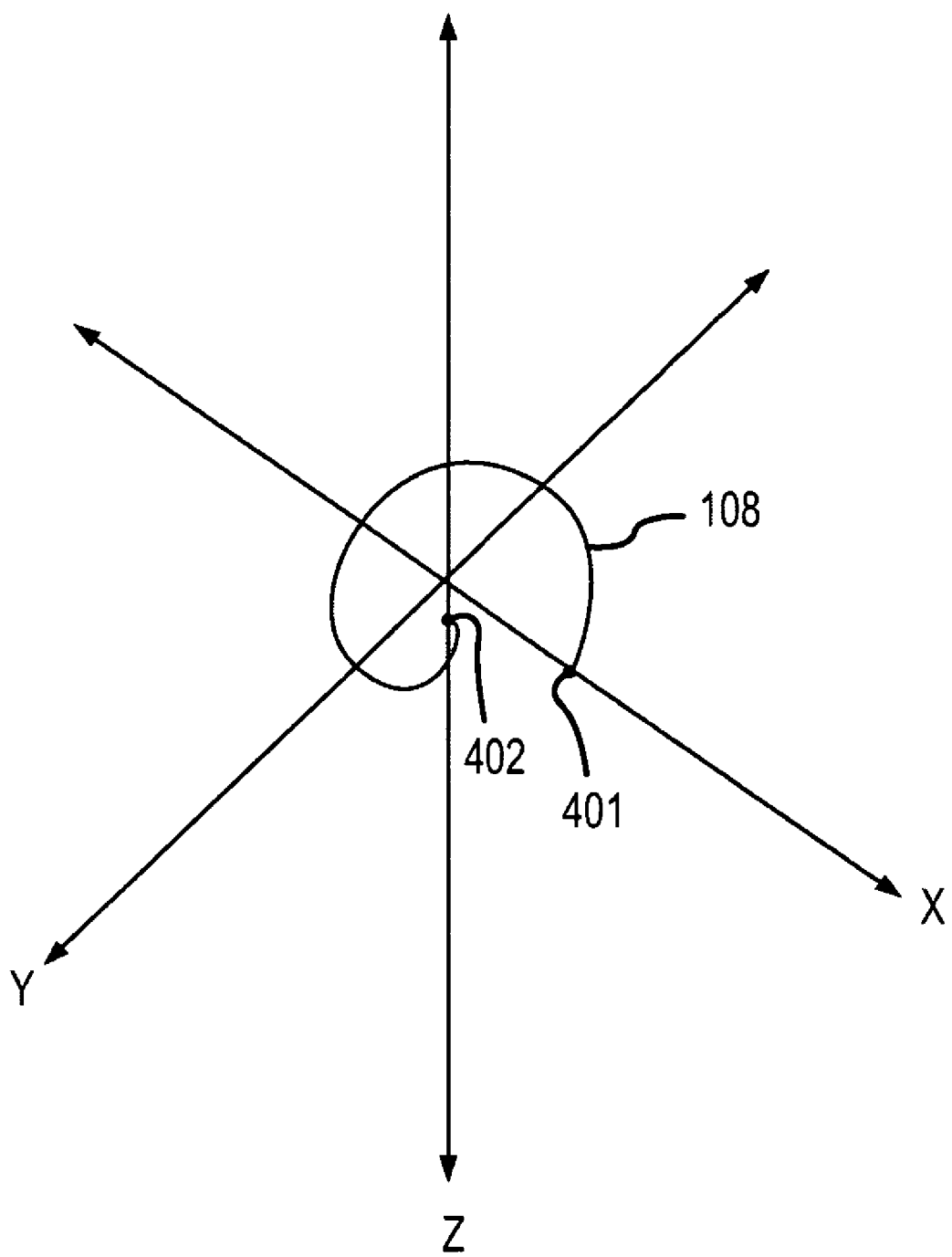
FIG. 4 is a three-dimensional graph that shows the shape and length of a lead-in path according to an embodiment of the invention.

FIG. 4 is a three-dimensional graph that shows the shape and length of the lead-in path 108 according to an embodiment of the invention. In this embodiment, the lead-in path extends substantially the full circumference of the separator chamber 103. As a result, the lead-in path 108 describes a substantially spiral path, wherein the ending point 402 is vertically below the starting point 401.

The air/liquid separator according to the invention can be implemented according to any of the embodiments in order to obtain several advantages, if desired. The air/liquid separator provides an improved air/liquid separation. The offset inlet design provides an improved air/liquid separation due to the increased air/liquid airflow velocity in the air/liquid separator. The air/liquid separator provides effective removal of dirt and debris through the air/liquid separation. The improved air/liquid separation therefore enhances the cleaning performance of the vacuum cleaner. The improved airflow characteristics obtained through better air/liquid separator design provide an advantageous noise reduction. The air/liquid separator accomplishes these advantages with a small physical size.

The air/liquid separator does not require a filter element that needs to be cleaned and/or replaced. The taper geometry at bottom of the air/liquid separator reduces splashing of the separated liquid into the impeller air inlet tube. In addition, the taper geometry increases the velocity of the air/liquid airflow, improving separation. The efficient liquid removal prevents damage to the vacuum cleaner fan motor and extends the life of the vacuum cleaner.

What is claimed is:

1. A vacuum cleaner air/liquid separator, comprising:
    an offset air/liquid airflow inlet for receiving an air/liquid airflow, with the offset air/liquid airflow inlet possessing a width and a height;
    a substantially cylindrical separator chamber communicating with the offset air/liquid airflow inlet, wherein the offset air/liquid airflow inlet is radially offset from the separator chamber;
    a lead-in track extending from the offset air/liquid airflow inlet and at least partially around the circumference of the separator chamber, with the lead-in track tapering from substantially the width of the offset air/liquid airflow inlet into the separator chamber, wherein the air/liquid airflow is entrained into a downward spiraling path in the separator chamber by the lead-in track;
    an impeller air inlet tube extending down through the separator chamber, with the impeller air inlet tube including an air only inlet; and
    a separator impeller chamber adapted to house an impeller for generating the air/liquid airflow, with the separator impeller chamber communicating with an air outlet located on an exterior of the air/liquid separator and with the impeller air inlet tube.

2. The separator of claim 1, further comprising:
    a separator lower chamber, with the separator lower chamber opening into the separator chamber; and
    a liquid outlet located at a bottom of the separator lower chamber, wherein liquid separated from the air/liquid airflow drops out of the air/liquid separator through the liquid outlet.

3. The separator of claim 1, wherein the offset air/liquid airflow inlet introduces the air/liquid airflow into the separator chamber at a greater radial distance from a central axis than a distance of a chamber outer wall to the central axis.

4. The separator of claim 2, with the separator lower chamber comprising a substantially tapered separator lower chamber.

5. The separator of claim 2, with the separator lower chamber comprising a substantially conically tapered separator lower chamber.

6. The separator of claim 2, with the air only inlet of the impeller air inlet tube being located in the separator lower chamber.

7. The separator of claim 2, with the air only inlet of the impeller air inlet tube being located above the liquid outlet of the separator lower chamber.

8. The separator of claim 2, further comprising a liquid deflector skirt located on the impeller air inlet tube, with the liquid deflector skirt extending downwardly and outwardly from the impeller air inlet tube.

9. The separator of claim 2, further comprising one or more vanes located in the impeller air inlet tube.

10. The separator of claim 1, further comprising one or more vortex disrupter ribs positioned on an inner surface of a chamber outer wall.

11. A method of providing a vacuum cleaner air/liquid separator, the method comprising:
providing an offset air/liquid airflow inlet for receiving an air/liquid airflow, with the offset air/liquid airflow inlet possessing a width and a height;
providing a substantially cylindrical separator chamber communicating with the offset air/liquid airflow inlet, wherein the offset air/liquid airflow inlet is radially offset from the separator chamber;
providing a lead-in track extending from the offset air/liquid airflow inlet and at least partially around the circumference of the separator chamber, with the lead-in track tapering from substantially the width of the offset air/liquid airflow inlet into the separator chamber, wherein the air/liquid airflow is entrained into a downward spiraling path in the separator chamber by the lead-in track;
providing an impeller air inlet tube extending down through the separator chamber, with the impeller air inlet tube including an air only inlet; and
providing a separator impeller chamber adapted to house an impeller for generating the air/liquid airflow, with the separator impeller chamber communicating with an air outlet located on an exterior of the air/liquid separator and with the impeller air inlet tube.

12. The method of claim 11, further comprising:
providing a separator lower chamber, with the separator lower chamber opening into the separator chamber; and
providing a liquid outlet located at a bottom of the separator lower chamber, wherein liquid separated from the air/liquid airflow drops out of the air/liquid separator through the liquid outlet.

13. The method of claim 11, wherein the offset air/liquid airflow inlet introduces the air/liquid airflow into the separator chamber at a greater radial distance from a central axis than a distance of a chamber outer wall to the central axis.

14. The method of claim 12, with the separator lower chamber comprising a substantially tapered separator lower chamber.

15. The method of claim 12, with the separator lower chamber comprising a substantially conically tapered separator lower chamber.

16. The method of claim 12, with the air only inlet of the impeller air inlet tube being located in the separator lower chamber.

17. The method of claim 12, with the air only inlet of the impeller air inlet tube being located above the liquid outlet of the separator lower chamber.

18. The method of claim 12, further comprising providing a liquid deflector skirt located on the impeller air inlet tube, with the liquid deflector skirt extending downwardly and outwardly from the impeller air inlet tube.

19. The method of claim 12, further comprising providing one or more vanes located in the impeller air inlet tube.

20. The method of claim 11, further comprising providing one or more vortex disruptor ribs positioned on an inner surface of a chamber outer wall.

* * * * *